（12）United States Patent
Margetts

(10) Patent No.: US 7,214,640 B2
(45) Date of Patent: May 8, 2007

(54) IONIC MATERIAL

(75) Inventor: Graham Margetts, Shrophshire (GB)

(73) Assignee: Polymer Laboratories Limited, Birmingham (GB)

( * ) Notice: Subject to any disclaimer, the term of this patent is extended or adjusted under 35 U.S.C. 154(b) by 210 days.

(21) Appl. No.: 10/416,778

(22) PCT Filed: Oct. 16, 2002

(86) PCT No.: PCT/GB02/04677

§ 371 (c)(1),
(2), (4) Date: Sep. 10, 2003

(87) PCT Pub. No.: WO03/033549

PCT Pub. Date: Apr. 24, 2003

(65) Prior Publication Data

US 2004/0053777 A1 Mar. 18, 2004

(30) Foreign Application Priority Data

Oct. 16, 2001 (GB) ................................ 0124812.9

(51) Int. Cl.
B01J 31/00 (2006.01)
B01J 31/06 (2006.01)
(52) U.S. Cl. ...................... 502/159; 502/160; 502/162; 502/167; 502/168; 502/216
(58) Field of Classification Search ............... 502/159, 502/160, 167, 216, 162, 168; 252/62.54
See application file for complete search history.

(56) References Cited

U.S. PATENT DOCUMENTS

| 3,012,937 | A | | 12/1961 | Schlichting | |
| 3,923,766 | A | * | 12/1975 | Barter | ........................ 526/216 |
| 3,949,018 | A | * | 4/1976 | Agouri et al. | ............... 525/269 |
| 4,266,085 | A | * | 5/1981 | Kim et al. | .................. 585/645 |
| 5,367,031 | A | | 11/1994 | Marchin et al. | ......... 525/328.3 |
| 2002/0010079 | A1 | * | 1/2002 | Walzer et al. | ................ 502/117 |
| 2002/0177522 | A1 | * | 11/2002 | Alexander et al. | .......... 502/159 |

FOREIGN PATENT DOCUMENTS

| FR | 2.142.123 | | 1/1973 |
| JP | 53-146986 | * | 12/1978 |
| WO | WO97/38026 | | 10/1997 |
| WO | WO 01/74913 A1 | | 10/2001 |

* cited by examiner

Primary Examiner—Helene Klemanski

(57) ABSTRACT

The present invention relates to a material containing ionic groups, in particular, to the ionic materials that form an ionic pair with a free radical catalyst. Various applications of such materials are also described. Ionic materials can include magnetic particles. Examples of free radical catalysts that can be used include 2,2'-azobis(2-methylpropionamidine) dihydrochloride, and 2,2'-azobis[2-(2-imidazolin-2-yl) propane]dihydrochloride.

35 Claims, 1 Drawing Sheet

Figure 1:
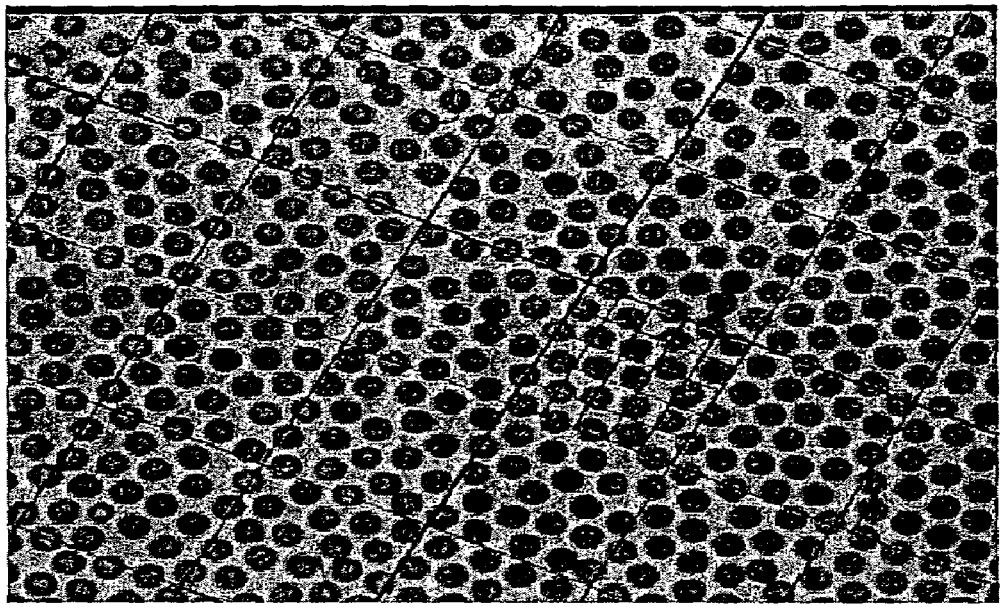

Large grid size 25μm.

Large grid size 25μm.

IONIC MATERIAL

The present invention relates to a material which contains ionic groups that are attached to the material, and form an ionic pair with a free radical catalyst. Polymers can then be formed from these site directed polymerisation points within the material. In addition the patent relates to a method for forming magnetic particles. The resulting materials can be used in various applications.

Non-magnetic and magnetic polymer particles are widely used in diagnostics, bioassays and life sciences research as they provide a means of separation of substances from complex mixtures. In brief, a ligand, e.g. antibody or antigen, is either non-covalently or covalently attached to the particle through chemical means. This complex is washed free of non-attached ligand and introduced into a sample e.g. blood containing a mixture of substances to compete for, or otherwise capture, analyte. The captured analyte is then detected using chemical, fluorescence or other means. The sensitivity and specificity of such separations depend, amongst other things, on the chemical properties of the particle.

It is a desired property of a microparticle that it contains chemical groups suitable for binding of a ligand and that the surface of the particle not reacted with ligand exhibit low non-specific binding characteristics.

The present invention provides a means to construct a particle with chemical groups attached to a polymer chain that are suitable for ligand binding. The polymer chain may be restricted to the interior of the particle and be accessible via the pores of the particle, or may extend to the surface of the particle or may extend beyond the surface of the particle.

The present invention also provides a means of manufacture of a superparamagnetic form of this particle by the deposition of magnetite at the ionic sites within the particle. A desired property of a superparamagnetic particle is that the concentration of the magnetite within the particle can be manipulated to achieve a suitably rapid response to a magnetic field. It is also a desirable property that the crystalline dispersion of the magnetite is fine enough such that each crystal cannot retain a residual magnetic moment after exposure to a magnetic field and that when the magnetic field is removed and the particles are re-dispersed they are not magnetically attracted to each other. The Japanese patent JP53146986 describes the addition of $Fe^{2+}$ salts to a sulfonated polystyrene bead. The $Fe^{2+}$ ions are then oxidized and precipitated to form magnetic particles. U.S. Pat. No. 4,774,265 describes the treatment of polymer particles with a solution of metallic ions capable of forming magnetic ferrites. The solution can swell or penetrate into the particles and as the particles contain groups capable of binding the metal salts, a proportion of the metal ions are retained. The metal hydroxides are precipitated by raising the pH, forming magnetic particles inside and on the surface of the particle. The present invention provides a method for forming superparamagnetic particles, by utilizing the ionic groups within the polymer particle for the capture Fe salts and then inducing nanocrystallization of magnetite. The ionic groups are released once the Fe is precipitated, allowing either the process of magnetite deposition to be repeated to control and increase the concentration of magnetite within the particles or to introduce free radical catalysts and subsequent polymer using site directed polymerization.

Addition polymers are formed by the activation of a free radical catalyst in the presence of suitable monomer(s). The position of the catalyst in a reaction is normally random so the location of the polymer is imprecise. The present invention provides a material which comprises one or more ionic groups which have formed ionic pairs with one or more free radical catalysts. Polymers will be formed at the site of the catalyst. By controlling the position of the ionic groups and the conditions of the polymerisation the position of the formed polymer can be directed and hence the architecture of the final composite controlled.

Suitable ionic groups include sulfates, sulfonates, phosphates, carboxylates, phenolics, siloxane, primary, secondary, tertiary or quaternary amines. A preferred material is a strong anion exchange resin such as a sulfonated polystyrene resin or a strong cation exchange resin.

The material can be polymeric in nature such as sulfonated or aminated polystyrene or poly(meth)acrylate, or may be non-polymeric such as silica or mica. The shape of the particle is normally spherical, e.g. beads, but may also be in the form of a membrane, mesh, film, gel, plug or any other type suitable to bioassay reagent formulations.

The free radical catalyst is ionic in nature and capable of forming an ion pair species with the ion containing material. The catalyst may be capable of thermal or redox initiation. Preferred thermal catalysts include 2,2'-azobis (2 amidinopropane) dihydrochloride, 2,2'-azobis[2-(2-imidazolin-2-yl) propane] dihydrochloride, 4,4'-Azobis(4-cyanopentanoic acid), ammonium persulfate or sodium persulfate. Preferred redox catalyst is Iron III chloride used in conjunction with hydrogen peroxide or other peroxide catalysts.

Other free radical catalysts capable of forming an ion pair species with the ion containing material can be used.

The material of the invention is formed by a free radical catalyst being absorbed via an ion exchange mechanism into the material, as the material contains ionisable groups which allow this exchange to occur.

The material is washed with a solution of the catalyst so that the catalyst is absorbed. The catalyst should be an organic or inorganic salt carrying an opposite charge to the charge of the ion groups within the material. An ion exchange equilibrium occurs in which the catalyst forms an ion pair with the ionic group attached to the material.

Subsequent washing with a non-ionic solution removes excess unbound catalyst but is unable to remove the ion-paired catalyst.

In a second aspect the present invention provides a method of forming a composite material comprising of the following steps:
(a) Addition of one or more monomers to material of the present invention;
(b) Generation of free radicals by the catalyst
(c) Formation of a polymer from the catalyst attached to the ionic groups.

The polymers can either extend beyond the outer surface of the material to form short spacers or long extensions of several microns in length, or remain wholly within the material. The polymers are produced via a free radical mechanism and are typically styrenic, (meth)acrylate, (meth)acrylamides, vinyl acetate. Any monomers polymerisable via a free radical mechanism could be used.

Suitably the catalyst-loaded material is added to a solution or suspension containing monomers, and exposed to heat or a co-catalyst. The catalysts decompose to generate free radicals. Therefore polymerisation occurs at the site of the catalyst, which is held by ionic interactions within the material.

A composite material so formed represents a third aspect of the invention.

In a fourth aspect the present invention provides a method of preparing magnetic material comprising of the following steps:
(a) Contacting a material comprising cationic groups with a solution of $Fe^{3+}$ so that all the cationic sites are exchanged for $Fe^{3+}$
(b) Adjusting the pH to pH 9–10, e.g. by using ammonia to precipitate Fe(III) hydroxide
(c) Reducing at least some of the Fe(III) hydroxide to Fe(II) hydroxide (d) Crystallisation of the two iron hydroxides to form magnetite ($Fe_3O_4$).

The cationic groups are reformed at the end of step d, allowing the process of $Fe^{3+}$ addition to be repeated to increase the concentration of magnetic particles within the material before the polymer is generated. The reduction step (c) can suitably be achieved using hydrazine.

The method for forming the paramagnetic material can further comprise the following steps:
(e) Loading the reformed cationic groups with free radical catalyst
(f) Addition of one or more monomers to material;
(g) Generation of free radicals by the catalyst
(h) Formation of a polymer from the catalyst attached to the ionic groups, in order to form a paramagnetic composite material.

The oxidation process described in Japanese patent JP53146986 can also be employed to introduce the magnetite or a ferrite using $Fe^{2+}$ or a mixture of $Fe^{2+}$ and other metal $^{2+}$ ions such as $Ni^{2+}$, $Mn^{2+}$ prior to the formation of the composite particles. Thus another aspect of the invention provides a method of forming a paramagnetic material comprising of the following steps:
(a) Contacting a material having cationic groups with a solution containing $Fe^{2+}$ ions so that all the cationic sites are exchanged for a metal $^{2+}$ ion;
(b) Adjusting the pH to pH 9–10;
(c) Aerateing the material at 65° C. until it gains magneticity
(d) Loading the reformed cationic groups with free radical catalyst
(e) Addition of one or more monomers to material;
(f) Generation of free radicals by the catalyst
(g) Formation of a polymer from the catalyst attached to the ionic groups.

The material of the present invention can then be used in diagnostic assays such as bioassays, immunoassays, flow cytometry, and DNA hybridisation. For instance, polymeric extensions formed according to the methods of the invention can be used for the attachment of other bioassay particles such as immunoglobulins.

The invention will now be described with reference to the following examples, which should in no way be construed as limiting the invention. The Examples refer to the following figures:

FIG. 1. Optical micrograph of beads with polyacrylic acid tentacle structure.

Figure 2:
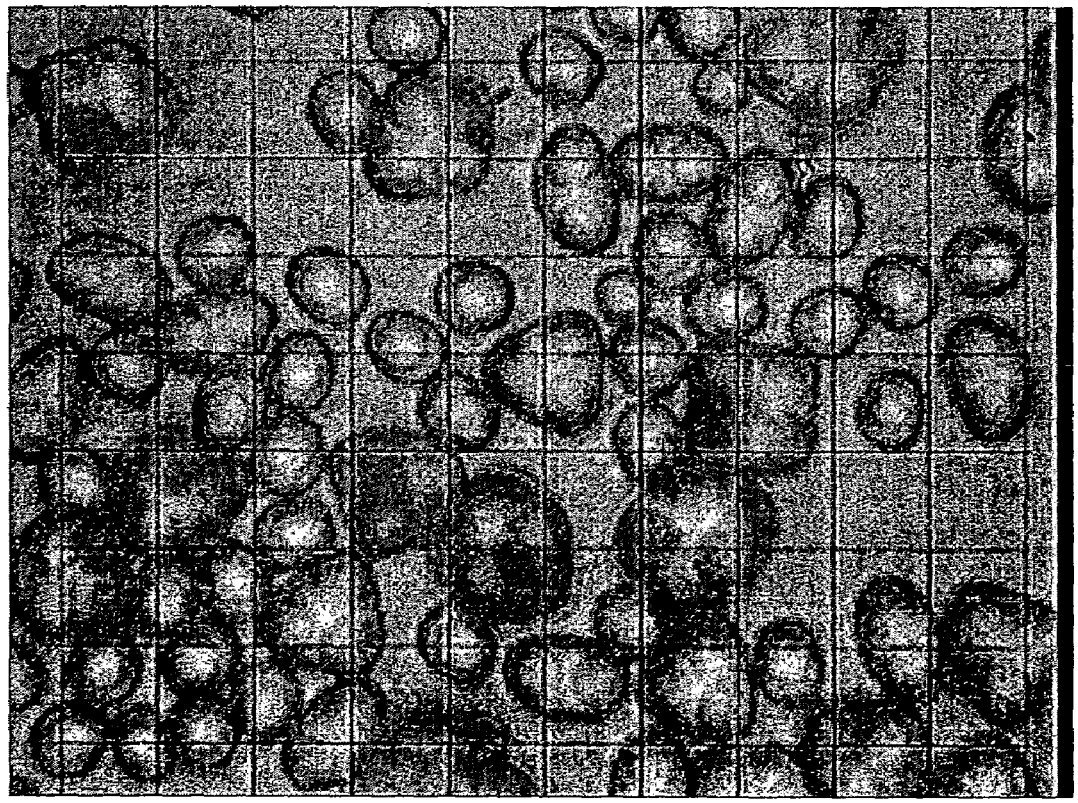

FIG. 2. Optical micrograph of with a poly (vinyl acetate) layer around the surface beads magnetic.

EXAMPLES

1) Magnetic Particles a) Magnetite Loading 30 g of a sulfonated polystyrene beads (8 μm modal size, 8% cross-linked) with an hydrogen counter-ion was washed on a sinter with 1L of a 5 wt % iron III chloride solution. The beads were then washed with R.O. water until the eluent was free of $Fe^{3+}$ ions. The loaded beads were dispersed into R.O. water and made up to a total slurry weight of 550 g. This slurry was poured into a 1 L, 3 necked round bottom flask fitted with a condenser, centrifugal stirrer and nitrogen inlet. The pH was adjusted to 9.5 with ammonia solution and the slurry was purged with nitrogen for 1 hour at 85° C. 3 mls of a 35 wt % solution of hydrazine was added and the reaction allowed to proceed with gentle stirring for 3 hours. A colour change for the slurry from orange-brown to brown-black was noted.

The reaction was cooled and the beads filtered on a sinter and washed with R.O. water. A small amount of black particles were washed from the beads. Washing was continued until the eluent was clear.

The beads were contacted with iron III chloride solution and reduced with hydrazine two further times to produce composite superparamagnetic particles with a magnetic susceptibility value of 59.7 $m^3/Kg$.

b) Initiator Loading:

1 g of magnetic particles from section (a) were washed on a sinter with 50 mls of a 2 wt % solution of 2,2'azobis(2-methylpropionamidine) dihydrochloride in R.O. water. The beads were then washed with R.O. water until the eluent was free of chloride ions. The beads were then titrated on a Metrohm autotitrator against standardised potassium hydroxide to determine the free sulfonic acid groups remaining in the beads. 1 g of magnetic particles of example 1 were also titrated before contact with initiator. The results are in table 1:

TABLE 1

| | free —SO3H (mmol/g) |
|---|---|
| magnetic particles from example 1 | 2.06 |
| initiator loaded magnetic particles from example 1 | 0.15 |

Results indicate that ~1 mmol of initiator was loaded per g of magnetic beads.

c) Site Specific Initiation:

1 g of initiator loaded beads from section (b) was dispersed into 30 g of R.O. water/1 g acrylamide monomer in a 3 necked round bottom flask fitted with a condenser, centrifugal stirrer and nitrogen inlet. The suspension was purged with nitrogen for 20 mins and the temperature then increased to 70° C. for 2 hrs.

The product was filtered and washed with water. The beads were then dispersed in 1M NaOH solution at 60° C. for 1 hour to hydrolise the acrylamide to acrylic acid. Resultant beads have a tentacle structure with the acrylic acid stretching away from the surface. An optical micrograph of the beads is shown in FIG. 1.

2) Poly(Vinyl Acetate) Coated Particles:

1 g of initiator loaded particles from example 1 were dispersed in 75 ml of water containing 3.8 g of ALCOTEX 78, which is a poly(vinvl alcohol)-based suspending agent available from Harlow Chemicals. This suspension was poured into a 250 ml round bottomed flask fitted with a condenser, nitrogen inlet and centrifugal stirrer. 8.3 g of vinyl acetate monomer was added to the suspension and the mixture stirred and purged with nitrogen for 2 minutes. The temperature was increased to 55° C. and polymerization continued for 24 hours. The resultant beads were filtered, and washed with water. Optical microscopy (FIG. 2) indicated a visible poly(vinyl acetate) layer about the surface of the magnetic beads.

The invention claimed is:

1. A composition comprising:
   (a) a material which comprises at least one ionic group; and
   (b) at least one free radical polymerization catalyst,
wherein said ionic group forms an ionic pair with said catalyst.

2. The composition of claim 1, wherein the ionic group is selected from the group consisting of a sulfate, a sulfonate, a phosphate, a carboxylate, and ammonium.

3. The composition of claim 1, wherein said catalyst is selected from the group consisting of 2,2'-azobis(2-methylpropionamidine) dihydrochloride, and 2,2'-azobis[2-(2-imidazolin-2-yl) propane] dihydrochloride.

4. The composition of claim 1, wherein the material is polymeric.

5. The composition of claim 4, wherein the material is selected from the group consisting of a sulfonated polysytrene, and a poly(meth)acrylate having a quarternary ammonium group.

6. The composition of claim 1, wherein the material is an inorganic crystalline material.

7. The composition of claim 6, wherein the material is selected from a group consisting of silica and alumina.

8. The composition of claim 1, wherein the material is in the form of a bead.

9. The composition of claim 8, wherein the bead is an ion exchange bead.

10. A method of forming a composite material comprising:
    (a) combining at least one monomer and a composition of claim 1, wherein the monomer is both capable of undergoing a process of free radical polymerization to form a polymer and capable of bonding to said ionic groups;
    (b) initiating free radical generation by said catalyst; and
    (c) polymerizing the monomer to form said polymer,
thereby obtaining the composite material having said polymer bonded to the ionic groups.

11. The method of claim 10, wherein the polymer extends beyond the outer surface of the material.

12. The composite material formed by the method of claim 10.

13. A composition comprising:
    (a) a material which comprises at least one ionic group; and
    (b) at least one free radical polymerization catalyst,
wherein said material comprises a magnetic particle, and wherein said ionic group forms an ionic pair with said catalyst.

14. The composition of claim 13, wherein said ionic group is selected from the group consisting of a sulfate, a sulfonate, a phosphate, a carboxylate, and ammonium.

15. The composition of claim 13, wherein said catalyst is selected from the group consisting of 2,2'-azobis(2-methylpropionamidine) dihydrochloride, and 2,2'-azobis[2-(2-imidazolin-2-yl) propane] dihydrochloride.

16. The composition of claim 13, wherein said material is polymeric.

17. The composition of claim 16, wherein said material is selected from the group consisting of a sulfonated polysytrene, and a poly(meth)acrylate having a quarternary ammonium group.

18. The composition of claim 13, wherein said material is an inorganic crystalline material.

19. The composition of claim 18, wherein said material is selected from a group consisting of silica and alumina.

20. The composition of claim 13, wherein said material is in the form of a bead.

21. The composition of claim 20, wherein the bead is an ion exchange bead.

22. A method of forming a composite material comprising:
    (a) combining at least one monomer and a composition of claim 13, wherein the monomer is both capable of undergoing a process of free radical polymerization to form a polymer and capable of bonding to said ionic groups;
    (b) initiating free radical generation by said catalyst; and
    (c) polymerizing the monomer to form said polymer,
thereby obtaining the composite material having said polymer bonded to the ionic groups.

23. The method of claim 22, wherein the polymer extends beyond the outer surface of the material.

24. The composite material formed by the method of claim 22.

25. A composition comprising:
    (a) a material which comprises at least one ionic group; and
    (b) at least one free radical polymerization catalyst selected from the group consisting of 2,2'-azobis(2-methylpropionamidine) dihydrochloride, and 2,2'-azobis[2-(2-imidazolin-2-yl) propane] dihydrochloride,
wherein said material comprises a magnetic particle, and wherein said ionic group forms an ionic pair with said catalyst.

26. The composition of claim 25, wherein said ionic group is selected from the group consisting of a sulfate, a sulfonate, a phosphate, a carboxylate, and ammonium.

27. The composition of claim 25, wherein said material is polymeric.

28. The composition of claim 27, wherein said material is selected from the group consisting of a sulfonated polysytrene, and a poly(meth)acrylate having a quarternary ammonium group.

29. The composition of claim 25, wherein said material is an inorganic crystalline material.

30. The composition of claim 29, wherein said material is selected from a group consisting of silica and alumina.

31. The composition of claim 25, wherein said material is in the form of a bead.

32. The composition of claim 31, wherein the bead is an ion exchange bead.

33. A method of forming a composite material comprising:
    (a) combining at least one monomer and a composition of claim 25, wherein the monomer is both capable of undergoing a process of free radical polymerization to form a polymer and capable of bonding to said ionic groups;
    (b) initiating free radical generation by said catalyst; and
    (c) polymerizing the monomer to form said polymer,
thereby obtaining the composite material having said polymer bonded to the ionic groups.

34. The method of claim 33, wherein the polymer extends beyond the outer surface of the material.

35. The composite material formed by the method of claim 33.

* * * * *